J. A. STEWART.
Cotton-Planter

No. 15,260.  Patented July 1, 1856.

UNITED STATES PATENT OFFICE.

J. A. STEWART, OF FRANKLIN, KENTUCKY.

IMPROVEMENT IN COTTON-SEED PLANTERS.

Specification forming part of Letters Patent No. 15,260, dated July 1, 1856.

*To all whom it may concern:*

Be it known that I, J. A. STEWART, of Franklin, in the county of Simpson and State of Kentucky, have invented a new and Improved Machine for Planting Cotton-Seeds; and I do hereby declare that the following is a full, clear, and exact description of the same, reference being had to the annexed drawings, making a part of this specification, in which—

Figure 1:
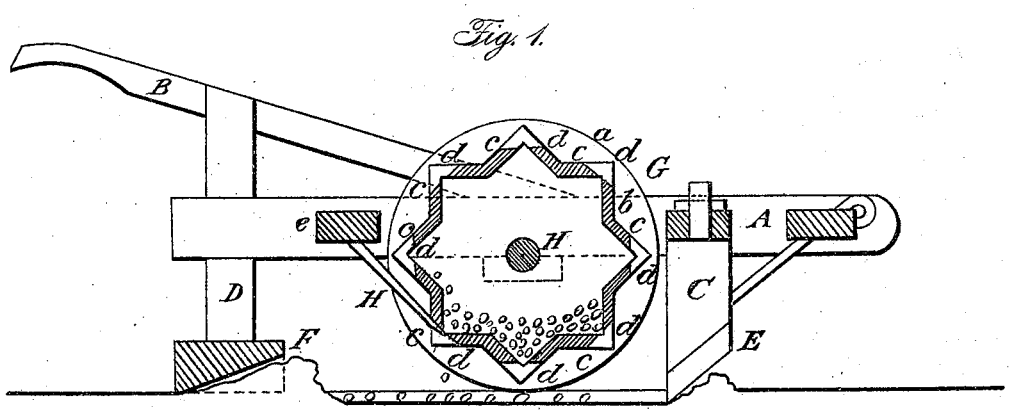
Figure 2:
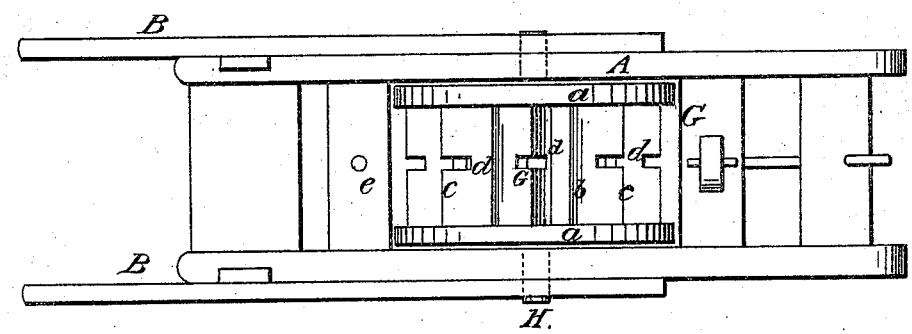

Figure 1 is a longitudinal vertical section of my improvement, the plane of section being through the center. Fig. 2 is a plan or top view of the same.

Similar letters of reference indicate corresponding parts in the two figures.

My invention consists in employing a rotating hopper formed in a peculiar manner, as will be hereinafter fully shown and described, and used in connection with a clearing-rod, so that the seed will be properly detached or separated from each other by the rotation of the hopper, and discharged through slots cut in the periphery thereof into the furrow.

To enable others skilled in the art to fully understand and construct my invention, I will proceed to describe it.

A represents a square or rectangular frame, having the handles B B attached to it.

C represents a pendant or hanger attached to the front end of the frame, and D is a pendant or hanger attached to the back end.

To the pendant C there is attached a furrow-share, E, and a covering-share, F, is attached to the pendant D.

G represents a hopper or distributing-wheel, which is formed of two circular disks, $a$ $a$, placed at a suitable distance apart upon a shaft, H, said shaft working in suitable bearings on the frame A. The disks $a$ $a$ rest upon or touch the ground, and are thereby rotated as the implement is drawn along.

Between the two disks $a$ $a$ there is placed a zigzag rim, $b$. (Shown clearly in Fig. 1.) This rim may be made of wood or sheet metal, and the apexes of the projections $c$, formed by the zigzag rim, have slots $d$ cut in them, said slots being sufficiently large to allow the cotton-seed to pass through them.

H represents a rod or spike, the upper end of which is attached to the under side of the cross-piece, $e$, of the frame A. The rod or spike is placed in an inclined position, and its lower end, as the hopper rotates, passes into or through the slots $d$ in the projections $c$.

The cotton-seed is placed within the hopper or wheel G, and as the implement is drawn along the hopper is rotated, and the seed passes through the slots $d$ into the furrow made by the share E, the seed being covered by the share F. The rod or spike H prevents the slots from being choked with the seed by forcing the seed therefrom in case of any sticking in them.

Cotton-seed is the most difficult kind of seed to plant by a machine, as they are covered by short fibers of cotton, which not only cause the seed to adhere together, but also prevent them from passing through the slots, holes, or orifices of a distributing device. Many forms of distributing devices have been employed to remedy the difficulty, but none have hitherto been successful. By constructing the hopper or wheel G as herein shown the seeds are detached from each other as the hopper or wheel rotates, in consequence of the angular projections formed by the zigzag rim $b$, and the rod or spike insures their discharge through the slots $d$.

I do not claim a rotating hopper or distributing-wheel irrespective of the form herein shown, for they have been previously used; but What I do claim as new, and desire to secure by Letters Patent, is—

1. The hopper or wheel G, formed of the disks $a$ $a$ and zigzag rim $b$, provided with slots $d$, substantially as shown, for the purpose specified.

2. The hopper or wheel G, in combination with the clearing rod or spike H, arranged as shown and described, for the purpose set forth.

J. A. STEWART.

Witnesses:
W. C. MONTAGUE,
G. W. WHITESIDE.